Dec. 10, 1963   E. F. GREEDY ETAL   3,113,574
CORN CONVEYING, ORIENTING AND HUSKING MACHINE
Filed Aug. 14, 1959   3 Sheets-Sheet 1
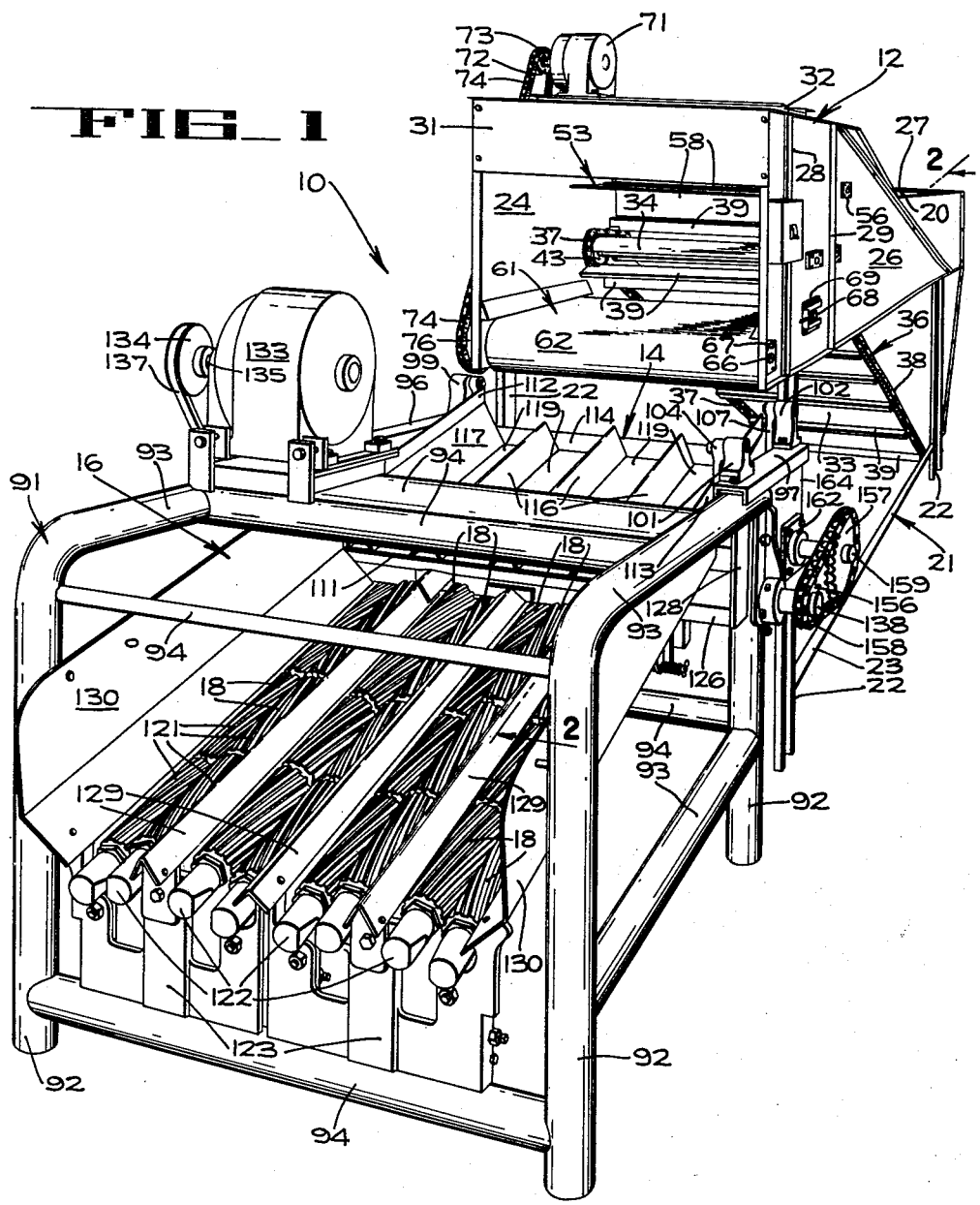
FIG_1
INVENTORS
EDWIN F. GREEDY
EDWARD J. SCHAAF
BY Hans G. Hoffmeister
ATTORNEY

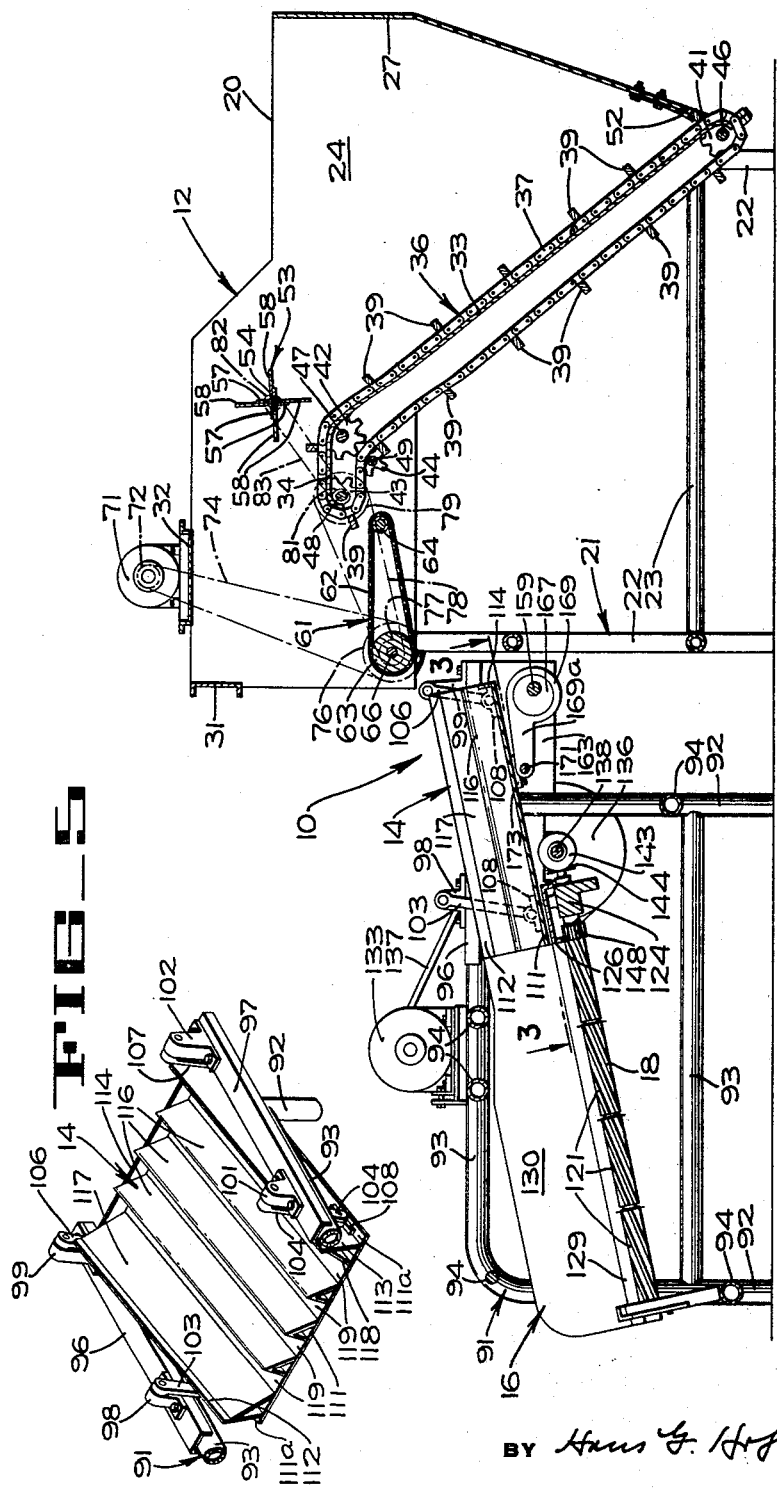

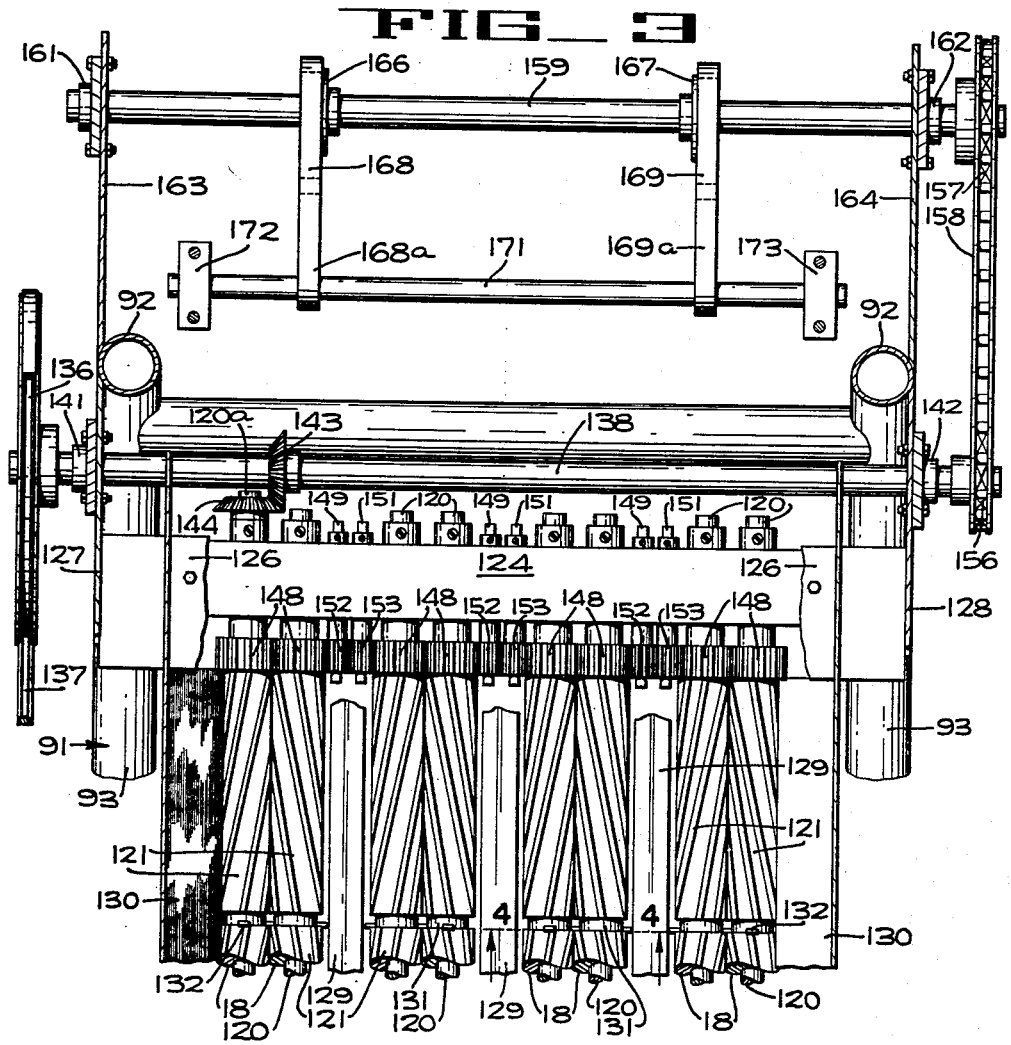
FIG_3
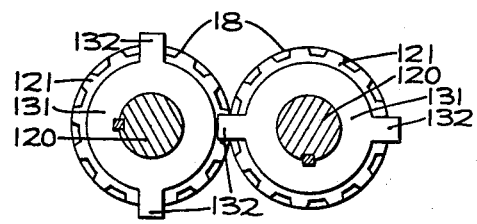
FIG_4
INVENTORS
EDWIN F. GREEDY
EDWARD J. SCHAAF
BY Hans G. Hoffmeister
ATTORNEY

United States Patent Office 3,113,574
Patented Dec. 10, 1963

3,113,574
CORN CONVEYING, ORIENTING AND HUSKING MACHINE
Edwin F. Greedy and Edward J. Schaaf, Hoopeston, Ill., assignors to FMC Corporation, a corporation of Delaware
Filed Aug. 14, 1959, Ser. No. 833,748
7 Claims. (Cl. 130—5)

The present invention appertains to corn husking machines and more particularly relates to an apparatus for aligning and feeding ears of corn to the husk removing section of the machine.

One object of the present invention is to provide an improved corn husking machine.

Another object is to provide an improved apparatus for feeding ears of corn to and aligning ears of corn with the husk removing section of the machine.

Another object is to provide an improved automatic apparatus for receiving ears of corn in bulk and for discharging the ears separately into the husk removing section of the corn husking machine.

These and other objects and advantages of the present invention will become apparent from the following description and the accompanying drawings, in which:

FIG. 1 is a perspective of the corn husking machine of the present invention.

FIG. 2 is a vertical section of the corn husking machine of FIG. 1, taken along lines 2—2 of FIG. 1.

FIG. 3 is an enlarged section, with parts broken away, taken along lines 3—3 of FIG. 2.

FIG. 4 is an enlarged section taken along lines 4—4 of FIG. 3.

FIG. 5 is an enlarged perspective of a shaker unit of the corn husking machine.

The corn husking machine 10 (FIGS. 1 and 2) of the present invention comprises an ear feeding and aligning apparatus 12 which receives ears of corn in bulk and discharges individual, partially aligned ears onto a shaker 14 of a husking unit 16. The shaker 14 aligns all ears, which have not previously been aligned, and discharges the aligned ears to a position between pairs of cooperating rollers 18 of the husk removing section of the husking unit 16.

The ear feeding and aligning apparatus 12 comprises a supply hopper 20 mounted on a frame 21 having vertical legs 22 rigidly held in parallel spaced relation by tubular longitudinal members 23. The hopper 20 includes side walls 24 and 26 bolted to the frame 21 and a front wall 27 bolted to the side walls 24 and 26. Suitable angle members 28 and 29 (FIG. 1) are bolted to the side walls 24 and 26 to stiffen the same, and transverse channel members 31 and 32 are bolted to and extend between the forward upper end of walls 24 and 26 to hold the walls in their desired spaced relationship. A stationary, upwardly inclined elevator floor 33 (FIG. 2) is bolted between the side walls 24 and 26. The lower end of the floor 33 is disposed closely adjacent the lower end of the front wall 27, and the upper end of the floor 33 terminates in a horizontal section 34 having a downwardly curved end.

An elevator 36, which carries ears upwardly out of the hopper, comprises a pair of spaced endless chains 37 and 38 having pusher slats 39 secured therebetween at spaced intervals therealong. The chains 37 and 38 (FIG. 1) are trained around pairs of sprockets 41, 42, 43 and 44 (FIG. 2) which pairs of sprockets are keyed on shafts 46, 47, 48 and 49, respectively. The shafts 46, 47, 48 and 49 are journalled in bearings bolted to the side walls 24 and 26. The upper run of the elevator 36 rides against the floor 33, which is of sufficient length to curve around the shafts 46 and 48 to prevent ears of corn from falling between the upper and lower runs of the elevator 36. A flexible flap 52 is bolted to the wall 27 and projects downwardly into the path of movement of the elevator slats 39 to prevent the ears of corn from being discharged from the hopper through the opening between the lower end of the wall 27 and the elevator floor 33.

A rotary control paddle 53 is provided in order to control the rate of discharge of ears from the elevator 36. The control paddle 53 comprises a shaft 54 journalled in bearings 56 (only one shown in FIG. 1) bolted to the side walls 24 and 26. Four equally spaced, radially extending straps 57 (FIG. 2) are welded to the shaft 54 and each strap 57 has a flexible flap 58 bolted thereon. The flaps 58 are positioned to move closely adjacent the elevator slats 39 as the slats 39 move around the sprockets 42 and onto the horizontal portion of the elevator 36. The control paddle 53 is driven in a counterclockwise direction (FIG. 2) and sweeps excessive ears off the upper end of the elevator 36 into the portion of the hopper 20 positioned therebelow.

The ears, which are not swept off of the elevator 36, are discharged from the elevator onto a high speed, ear-separating and aligning conveyor 61. The conveyor 61 comprises an endless belt 62 which is trained around a drive roller 63 and a driven roller 64. The drive roller 63 is keyed to a drive shaft 66 journalled in bearings 67 (FIG. 1) bolted to the walls 24 and 26. Similarly, the driven roller 64 is keyed to a shaft 68 journalled in bearings 69 bolted to the walls 24 and 26. The ears of corn are usually disposed parallel to the elevator slats 39 when they are discharged from the elevator 36 and, upon striking the fast moving conveyor 61, the ears become spaced from each other because of the speed difference between the elevator 36 and the conveyor 61. Also, due to the fact that the heavier end of each ear will tend to hit the conveyor 61 before the rest of the ear, approximately 60% of the ears are immediately jerked into alignment with the path of movement of the conveyor 61.

The elevator 36, the ear control paddle 53 and the ear separating and aligning conveyor 61 are driven by a motor 71 which is bolted to the channel member 32 and has a sprocket 72 keyed on the motor output shaft 73. A chain 74 is trained around the sprocket 72 and around a sprocket 76 keyed on the drive shaft 66 (FIG. 2) of the conveyor 61. A smaller diameter sprocket 77 is keyed to the drive shaft 66 and is connected by a chain 78 to a larger sprocket 79 that is keyed on the shaft 48. The conveyor 61 is driven approximately twice as fast as the elevator 36. A sprocket 81 is keyed to the shaft 48 and a sprocket 82 is keyed to the shaft 54 of the ear control paddle 53. A chain 83 is trained around the sprockets 81 and 82 and drives the ear control paddle 53 in timed relation with the elevator 36 in such a way that one of the flexible flaps 58 is aligned with one of the elevator slats 39 as they pass each other.

The above described ear feeding and aligning apparatus 12 is not necessarily structurally connected to the husking unit 16 but is operatively associated therewith so that it can discharge the partially aligned ears of corn onto the shaker 14 of the unit 16.

The husking unit 16 (FIGS. 1 and 2) comprises a rigid tubular frame 91 of welded construction having vertical legs 92, upper and lower horizontal longitudinally extending members 93, and laterally extending members 94. Channel extensions 96 and 97 (FIG. 1) are rigidly secured to and project rearwardly of the upper horizontal members 93. The channel extension 96 (FIG. 5) has spaced bearings 98 and 99 bolted thereto, and the channel extension 97 has similarly spaced bearings 101 and 102 secured thereto. Rocker arms 103 and 104 of identical length are pivotally supported on stub shafts projecting from the bearings 98 and 101, respectively, and slightly shorter arms 106 and 107 are pivotally supported on stub shafts projecting from the bearings 99 and 102, respectively. The lower end of each of the arms 103, 104, 106 and 107 is pivotally connected to one of four bearings 108 (only two being shown in FIG. 2) which are bolted to a bottom plate 111 of the shaker 14.

The shaker 14 comprises the bottom plate 111 (FIG. 5), vertical side walls 112 and 113 welded on the plate 111, and an integral upturned forward wall 114. The bearings 108 are bolted on extensions 111a of the floor 111 which project laterally outwardly of the walls 112 or 113. Inverted V-shaped ear aligning guides 116 are welded to the bottom plate 111, and outwardly flared deflectors 117 and 118 are welded to the bottom plate 111 and to the walls 112 and 113, respectively. The guides 116 and the deflectors 117 and 118 separate and align the ears of corn into four rows or lanes 119 for discharge onto the pairs of husking rollers 18 (FIG. 1) of the husking unit 16. Certain drive parts, soon to be described, cause the shaker 14 to oscillate longitudinally of the machine 10.

The pairs of cooperating parallel husks removing rollers 18 are in wringer-like contact and are aligned with the lanes 119 for receiving ears of corn therefrom. Each roller 18 includes a shaft 120 (FIGS. 3 and 4) that has a resilient fluted husk gripping cover 121 which is made in several tubular sections that are keyed on their associated shafts 120. The lower ends of the shafts 120 are journalled in cup-shaped bearings 122 (FIG. 1) which are bolted on brackets 123 which are, in turn, bolted on the laterally extending frame member 94 adjacent the discharge end of the husking unit 16. The upper ends of the shafts 120 are journalled in a bearing bracket 124 (FIGS. 2 and 3) which is secured to a channel member 126 that extends transversely across the husking unit 16. The ends of the channel member 126 are rigidly secured to plates 127 (FIG. 3) and 128 each of which is welded to one of the forward legs 92 and the associated upper horizontal member 93 (FIG. 1). Inverted V-shaped guides 129 are bolted to the channel member 126 and to the brackets 123 and are aligned with the guides 116 on the shaker 14. Side plates 130 are secured to the frame 91 and guide ears of corn onto the pairs of rollers 18 adjacent thereto.

In order to loosen the husks from the ears so that the husks can be more readily gripped and drawn between the pairs of cooperating rollers 18, a collar 131 (FIG. 3 and 4) having a pair of diametrically opposed husk rippers 132 rigidly secured thereon, is mounted between each of the tubular fluted sections of the husk gripping cover 121. The collars 131 are keyed on the shafts 120 of their associated rollers 18 as clearly shown in FIGURE 4.

A motor 133 (FIG. 1) supplies the power for driving the rollers 18 and the shaker 14 and is mounted on a pair of the laterally extending members 94 of the tubular frame 91. A pulley 134 keyed on the output shaft 135 of the motor 133 is connected to a large diameter pulley 136 (FIG. 3) by a belt 137. The pulley 136 is keyed to a drive shaft 138 which is journalled in bearings 141 and 142 bolted to the plates 127 and 128, respectively. A bevel gear 143 keyed on the shaft 138 meshes with a bevel gear 144 keyed on an extension 120a of one of the roller shafts 120. The shafts 120 each have a pinion 148 keyed thereon. Two idler shafts 149 and 151 journalled in the bearing bracket 124 between each cooperating pair of rollers 18 have pinions 152 and 153, respectively, keyed thereon. The pinions 148 of each cooperating pair of rollers 18 mesh with each other. The adjacent idler pinions 152 and 153 mesh with each other and with the adjacent pinions 148 of the rollers 18 on either side thereof. The drive shaft 138 is driven counterclockwise as viewed in FIG. 2. It will be seen, therefore, that the rollers 18 will all be driven at the same speed and in such a way that the contacting surfaces of each pair of rollers 18 move downwardly at their point of contact to impart a wringer-action to the corn husks drawn therebetween.

A sprocket 156 is keyed to the drive shaft 138 and is connected to a sprocket 157 by a chain 158. The sprocket 157 is keyed to an eccentric shaft 159 which is journalled in bearings 161 and 162 bolted to vertical plates 163 and 164, respectively. The plates 163 and 164 are rigidly secured to channel extensions 96 (FIG. 2) and 97 (FIG. 1), respectively, and to the adjacent vertical legs 92. A pair of eccentrics 166 and 167 (FIG. 3) are keyed to the eccentric shaft 159 and slidably receive eccentric straps 168 and 169, respectively. The eccentric straps 168 and 169 have integrally formed shaker actuating arms 168a and 169a, respectively, which rotatably journal a shaft 171 which is mounted in bearings 172 and 173. The bearings 172 and 173 are bolted to the bottom plate 111 (FIG. 2) of the shaker 14. It can be seen, therefore, that upon rotation of the shaft 159, the eccentrics 166 and 167 cause the shaker 14 to be oscillated longitudinally relative to the corn husking machine 10.

In the operation of the corn husking machine 10 of the present invention, ears of corn to be husked are dumped in bulk into the supply hopper 20 of the ear feeding and aligning apparatus 12. The slats 39 of the elevator 36, which is driven by the motor 71 and connected drive parts, move ears of corn upwardly to the horizontal section 34 of the elevator floor 33. At this point, the flaps 58 of the ear control paddle 53 are driven past the slats 39 of the elevator 36 in a direction opposite to the direction of movement of the elevator 36. The flaps 58 control the number of ears of corn moved onto the horizontal section 34 of the elevator floor 33 by contacting and moving excess ears off the elevator 36 and back into the hopper 20.

The ears remaining on the horizontal section 34 of the floor 33 are at a single level and are in most cases disposed parallel to the slats 39. The ears are then discharged onto the rapidly moving belt 62 of the ear separating and aligning conveyor 61. As the ears fall upon the fast moving belt 62, they are spaced from each other and most of the ears are jerked into alignment with the direction of movement of the belt 62. The spaced ears are then discharged onto the shaker 14. The guides 116 (FIG. 1) and deflectors 117 and 118 guide the already aligned ears into the lanes 119 and align the few ears which were not already aligned allowing the same to gravitate into the lanes 119.

The shaker 14 is oscillated by the previously described eccentrics 166 and 167 (FIG. 3) and associated drive parts thereby advancing the aligned ears of corn onto the pairs of cooperating husking rollers 18. Since the cooperating rollers 18 in each pair are moving in the opposite direction and downwardly at their point of contact, the husks are gripped by the cooperating resilient fluted covers 121 of the rollers 18 and are stripped from the ears of corn. The rippers 132 aid the husks removing operation by cutting into the husks to provide many loose husk ends which the cooperating fluted covers 121 can more readily grip. The husks fall from between the rollers 18 and are removed by any suitable means (not shown). The husked corn ears are discharged from the lower end of the rollers 18 onto any suitable conveying means (not shown).

From the foregoing description it is apparent that the corn husking machine of the present invention includes an improved apparatus for receiving ears of corn from a bulk supply and automatically feeding and aligning the ears of corn and discharging the same onto the husk removing portion of the machine. The ear feeding and aligning apparatus is inexpensive to manufacture and is simple in construction. The use of the apparatus greatly reduces the husking cost by eliminating the cost of manually feeding ears of corn into the husking unit.

While one embodiment of the present invention has been shown and described, it will be understood that various changes and modifications may be made without

Having thus described the present invention and the manner in which the same is to be used, what is claimed as new and desired to be protected by Letters Patent is:

1. A corn husking machine comprising a hopper for receiving ears of corn in bulk, a driven elevator in said hopper for lifting the ears of corn out of said hopper, a driven rotary paddle disposed adjacent the upper end of said elevator for deflecting excessive ears off said elevator, a conveyor driven at a higher speed than said elevator and having an unobstructed conveying surface for receiving and frictionally engaging the ears of corn from said elevator and permitting unrestricted movement of the ears of corn, said conveyor being arranged for spacing said ears from each other longitudinally of said conveyor and for swinging a number of said ears into alignment with said conveyor, a continuously oscillating shaker disposed adjacent said conveyor for receiving ears from said conveyor, deflecting means on said shaker for receiving the ears therebetween and for aligning those ears which were not aligned by said conveyor, a pair of cooperating husking rollers having means adjacent the discharge end of said shaker for receiving the aligned ears from said shaker and for removing the husks therefrom, and means for driving said rollers in opposite directions.

2. A corn husking machine comprising a hopper for receiving ears of corn in bulk, a driven elevator in said hopper for lifting the ears of corn out of said hopper, a driven rotary paddle disposed adjacent the upper end of said elevator and arranged to control the number of ears discharged from said elevator, a conveyor driven at high speed relative to said elevator and having an unobstructed conveying surface for receiving and frictionally engaging the ears of corn discharged from said elevator and for permitting unrestricted movement of the ears of corn, said conveyor being arranged to space said ears and to swing a majority of said ears into alignment with said conveying surface of said conveyor, a continuously oscillating shaker having means adjacent said conveyor for receiving the ears from said conveyor, deflecting means on said shaker for receiving the aligned ears therebetween and for aligning those ears which were not aligned by said conveyor, a pair of cooperating husking rollers having contacting surfaces adjacent the discharge end of said shaker for receiving the aligned ears from said shaker and for removing the husks therefrom, means connected to said rollers for driving said rollers in the opposite direction, and husk zipper means secured on said rollers at spaced intervals therealong and projecting outwardly of said contacting surface for digging into and loosening the corn husks for easier gripping by said rollers.

3. A corn husking machine comprising a hopper for receiving ears of corn in bulk, a continuously driven elevator having a horizontal upper section and means for lifting ears of corn out of said hopper, a continuously driven rotary paddle disposed above said elevator and having means for deflecting excessive ears off of said horizontal section of said elevator into said hopper, a conveyor having an unobstructed conveying surface for receiving and frictionally engaging said ears disposed below the horizontal portion of said elevator and driven at a speed faster than that of said elevator, said conveyor being arranged to space the ears of corn received from said elevator and permit unrestricted movement of the ears of corn thereon for turning the ears to a position generally parallel to the direction of movement of the conveyor, a continuously oscillating shaker having means adjacent said conveyor for receiving the ears from said conveyor and for agitating the same, means on said shaker for aligning the ears into a plurality of lanes, and husk removing means for receiving the aligned ears from said lanes for removing the husks therefrom.

4. A corn husking machine comprising a hopper for receiving ears of corn in bulk, a continuously driven elevator having a horizontal upper section and having means for lifting ears of corn out of said hopper, a continuously driven rotary paddle disposed above said elevator for deflecting excessive ears off of said horizontal section of said elevator into said hopper, a conveyor disposed below the horizontal portion of said elevator for receiving the ears discharged from said horizontal section and including an unobstructed conveying surface driven at a speed faster than that of said elevator and permitting unrestricted movement of the ears of corn thereon, said conveying surface being arranged for spacing the ears of corn from said elevator and for frictionally engaging and turning the ears so that their long axes are parallel to the direction of movement of the conveyor, a continuously oscillating shaker for receiving the ears from said conveyor and for agitating the same, means on said shaker for guiding the ears into a plurality of lanes of aligned ears, husk removing means for receiving the aligned ears from said lanes for removing the husks therefrom and including means for cuttings into the husks to loosen the same.

5. A corn husking machine comprising a hopper for receiving ears of corn in bulk, an elevator disposed in said hopper for collecting ears of corn from said hopper and elevating the same, continuously driven rotary means disposed closely adjacent to said elevator for deflecting excessive ears off said elevator and into said hopper, a rapidly driven conveyor belt having means for receiving ears discharged from said elevator and for frictionally engaging and swinging the ears into alignment with their axes parallel to the direction of movement of said conveyor, an inclined shaker having means for receiving the ears of corn from said conveyor, means on said shaker defining lanes into which the aligned ears gravitate, means connected to said shaker for oscillating the same, and husk removing means for receiving the aligned ears from said lanes for removing the husks therefrom.

6. A corn husking machine comprising a hopper for receiving ears of corn in bulk, an elevator disposed in said hopper for collecting ears of corn from said hopper and for elevating the same, said elevator having a horizontal extension at the upper end thereof, continuously driven rotary means disposed above and closely adjacent to said elevator for deflecting excessive ears off said elevator and into said hopper, a rapidly driven conveyor belt in position to receive and frictionally engage the ears of corn discharged from the horizontal extension of said elevator for spacing the ears and for twisting the ears into alignment with the direction of movement of said conveyor, an inclined shaker having means for receiving the ears of corn from said conveyor, means on said shaker defining lanes into which the aligned ears gravitate, means connected to said shaker for oscillating the same, pairs of husk-removing rollers disposed adjacent said conveyor for receiving the aligned ears from said lanes for removing the husks from the ears, husk ripping means secured on each roller and arranged to dig into the husks to loosen the same for easier acceptance by said rollers, and means connected to said rollers for driving the rollers in each pair in opposite directions.

7. A corn husking machine comprising a hopper for receiving ears of corn; a first conveyor having a conveying surface movable in a predetermined direction upwardly out of said hopper for removing from said hopper ears of corn disposed substantially transverse to the direction of movement of said conveying surface; a plurality of husking rolls disposed parallel to the direction of movement of said conveyor downstream from said conveyor; and means for rotating ears of corn from their transverse position on said conveying surface to a position parallel to said husking rolls including a fast moving second conveying surface disposed below the discharge end of said first conveyor for receiving ears of corn discharged therefrom whereby ears of corn dropping end down onto said fast moving second conveyor will be jerked toward said parallel position, and a shaker disposed between said second conveying surface and said husking rolls and having opposed downwardly inclined walls defining troughs parallel to said husking rolls.

References Cited in the file of this patent

UNITED STATES PATENTS

| | | | |
|---|---|---|---|
| 82,369 | Wesson | | Sept. 22, 1868 |
| 842,775 | Ellithorp | | Jan. 29, 1907 |
| 1,104,738 | Schuman | | July 21, 1914 |
| 1,866,605 | Stewart | | July 12, 1932 |
| 1,972,489 | Rideout et al. | | Sept. 4, 1934 |
| 2,080,717 | Hitchcock | | May 18, 1937 |
| 2,677,377 | Aasland | | May 4, 1954 |
| 2,684,147 | Holstebro | | July 20, 1954 |
| 2,810,467 | Bogaty | | Oct. 22, 1957 |

FOREIGN PATENTS

| | | |
|---|---|---|
| 1,066,144 | France | Jan. 20, 1954 |